United States Patent
Zait et al.

(10) Patent No.: US 11,068,460 B2
(45) Date of Patent: Jul. 20, 2021

(54) AUTOMATED REAL-TIME INDEX MANAGEMENT

(71) Applicant: Oracle International Corporation, Redwood Shores, CA (US)

(72) Inventors: Mohamed Zait, San Jose, CA (US); Sunil Chakkappen, Foster City, CA (US); Christoforus Widodo, Sunnyvale, CA (US); Zhan Li, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 325 days.

(21) Appl. No.: 16/248,479

(22) Filed: Jan. 15, 2019

(65) Prior Publication Data

US 2020/0042524 A1    Feb. 6, 2020

Related U.S. Application Data

(60) Provisional application No. 62/715,263, filed on Aug. 6, 2018, provisional application No. 62/748,457, filed on Oct. 20, 2018.

(51) Int. Cl.
*G06F 16/00* (2019.01)
*G06F 16/22* (2019.01)

(52) U.S. Cl.
CPC .................. *G06F 16/2272* (2019.01)

(58) Field of Classification Search
None
See application file for complete search history.

(56) References Cited

U.S. PATENT DOCUMENTS

| | | | |
|---|---|---|---|
| 5,564,037 A | 10/1996 | Lam | |
| 5,953,729 A | 9/1999 | Cabrera | |
| 7,010,663 B2 | 5/2006 | George et al. | |
| 7,213,012 B2 | 5/2007 | Jakobsson | |
| 7,475,098 B2 | 1/2009 | Patterson | |
| 7,644,730 B2 | 1/2010 | Reck | |
| 8,201,180 B2 | 6/2012 | Briscoe et al. | |
| 8,756,197 B1 | 6/2014 | Wilde | |
| 9,239,869 B1 | 1/2016 | Zhang | |
| 9,298,564 B2 | 3/2016 | Lee | |
| 9,575,849 B2 | 2/2017 | Mittal | |
| 2003/0074492 A1 | 4/2003 | Cochran | |
| 2003/0093408 A1* | 5/2003 | Brown | G06F 16/2272 |
| 2003/0158863 A1 | 8/2003 | Haskin | |

(Continued)

OTHER PUBLICATIONS

Susairaj, U.S. Appl. No. 15/266,340, filed Sep. 15, 2016, Office Action, dated Nov. 20, 2020.

(Continued)

*Primary Examiner* — Thu Nguyet T Le
(74) *Attorney, Agent, or Firm* — Hickman Becker Bingham Ledesma LLP

(57) ABSTRACT

Automated Index Management entails automated monitoring of query workload in a DBMS to determine a set of higher load queries to use to evaluate new potential indexes. Without the need of user approval or action, the potential indexes are automatically created, evaluated and tested, and then made available for system wide use for executing queries issued by end users. Indexes created by Automated Index Management are referred to herein as auto indexes.

20 Claims, 11 Drawing Sheets

(56) References Cited

U.S. PATENT DOCUMENTS

| | | |
|---|---|---|
| 2003/0167255 A1 | 9/2003 | GraBhoff et al. |
| 2004/0268068 A1 | 12/2004 | Curran |
| 2005/0131901 A1 | 6/2005 | Richter |
| 2005/0246397 A1 | 11/2005 | Edwards |
| 2006/0179261 A1 | 8/2006 | Rajan |
| 2006/0230035 A1 | 10/2006 | Bailey et al. |
| 2007/0106638 A1 | 5/2007 | Subramaniam |
| 2008/0052266 A1 | 2/2008 | Goldstein et al. |
| 2008/0072003 A1 | 3/2008 | Vu |
| 2008/0162491 A1 | 7/2008 | Becker |
| 2008/0162842 A1 | 7/2008 | Boutcher |
| 2008/0244028 A1 | 10/2008 | Le |
| 2008/0256311 A1 | 10/2008 | Lee |
| 2010/0250499 A1 | 9/2010 | McAlister |
| 2011/0022581 A1 | 1/2011 | Korlapati |
| 2011/0055201 A1* | 3/2011 | Burger ............... G06F 16/2453 707/719 |
| 2011/0191296 A1 | 8/2011 | Wall |
| 2011/0258199 A1 | 10/2011 | Oliver |
| 2011/0282864 A1 | 11/2011 | Collins |
| 2011/0307447 A1 | 12/2011 | Sabaa |
| 2012/0017060 A1 | 1/2012 | Kapanipathi |
| 2012/0221534 A1 | 8/2012 | Gao et al. |
| 2012/0259815 A1 | 10/2012 | Olson |
| 2013/0103644 A1 | 4/2013 | Shoens et al. |
| 2013/0297722 A1 | 11/2013 | Wright |
| 2013/0311520 A1 | 11/2013 | Nakagawa |
| 2014/0006354 A1 | 1/2014 | Parkinson |
| 2014/0095475 A1 | 4/2014 | Su et al. |
| 2014/0095530 A1 | 4/2014 | Lee |
| 2014/0108352 A1 | 4/2014 | Ahrens |
| 2014/0258239 A1 | 9/2014 | Amlekar |
| 2014/0365527 A1 | 12/2014 | Fuchs |
| 2015/0019909 A1 | 1/2015 | Griffith |
| 2015/0120780 A1 | 4/2015 | Jain |
| 2015/0154105 A1 | 6/2015 | Chaurasia |
| 2015/0254240 A1 | 9/2015 | Li |
| 2015/0370641 A1 | 12/2015 | Susairaj et al. |
| 2016/0092454 A1 | 3/2016 | Tao |
| 2016/0092534 A1 | 3/2016 | Choudhury et al. |
| 2016/0110292 A1 | 4/2016 | Choi |
| 2016/0140178 A1 | 5/2016 | Sirohi et al. |
| 2016/0171029 A1 | 6/2016 | Sanvido |
| 2016/0283274 A1 | 9/2016 | Kochunni |
| 2016/0378634 A1* | 12/2016 | Jovanovic ........... G06F 11/3034 707/688 |
| 2017/0272475 A1 | 9/2017 | Yu et al. |
| 2018/0075041 A1 | 3/2018 | Susairaj |
| 2018/0335952 A1 | 11/2018 | Rahman |
| 2020/0125413 A1 | 4/2020 | Thammaiah |

OTHER PUBLICATIONS

Le Sommer et al., "A Contract-Based Approach of Resource-Constrained Software Deployment", 12th European Conference on Computer Vision, ECCV, dated Jan. 1, 2002, 16 pages.

Tao, U.S. Appl. No. 14/849,012, filed Sep. 9, 2015, Interview Summary, dated May 3, 2018.

Tao, U.S. Appl. No. 14/849,012, filed Sep. 9, 2015, Interview Summary, dated Nov. 9, 2018.

Tao, U.S. Appl. No. 14/849,012, filed Sep. 9, 2015, Notice of Allowance, dated Jan. 22, 2019.

Tao, U.S. Appl. No. 14/849,012, filed Sep. 9, 2015, Office Action, dated Dec. 11, 2017.

Tao, U.S. Appl. No. 14/849,012, filed Sep. 9, 2015, Advisory Action, dated Nov. 21, 2018.

Susairaj, U.S. Appl. No. 14/313,926, filed Jun. 24, 2014, Office Action, dated Nov. 2, 2017.

Warden, Tim, "Storage Pooling, Thin Povisioning and Over-Subscription"., Las Solanas Consulting, dated Jul. 3, 2010, www.las-solanas.comstorage_virtualization/thin_provisioning.php>, 4 pages.

Walrond, Dan, "Using Netcat and Tar to Quickly Transfer Files Between Machines, AKA Tar Pipe", N.D. Accessed dated Oct. 19, 2017, web.archive.org/web/20130925161957/http://toast.djw.org, 9 pgs.

Oracle® Database, "Performance Tuning Guide",11g Release 1 (11.1), B28274-02 Chapter 15-18, dated Jul. 2008, 500 pages.

Haynes, T. "Network File System (NFS) Verison 4 Minor Version 2 Protocol", IERF Tools, dated May 17, 2014, from <tools.ietf.org/html/draft-ietf-nfsv4-minorversion2-24>, 8 pages.

Free Software Foundation, Inc., "GNU Tar: An Archiver Tool", dated Sep. 24, 2013, www.gnu.org/software/tar/manual/html_node/index.html_ 6 pages.

Lance Ashdown et al., "Oracle? Database SQL Tuing Guide 12c Release 1 (12.1)", Data Engineering, dated 2009, IEEE, 566 pages.

* cited by examiner

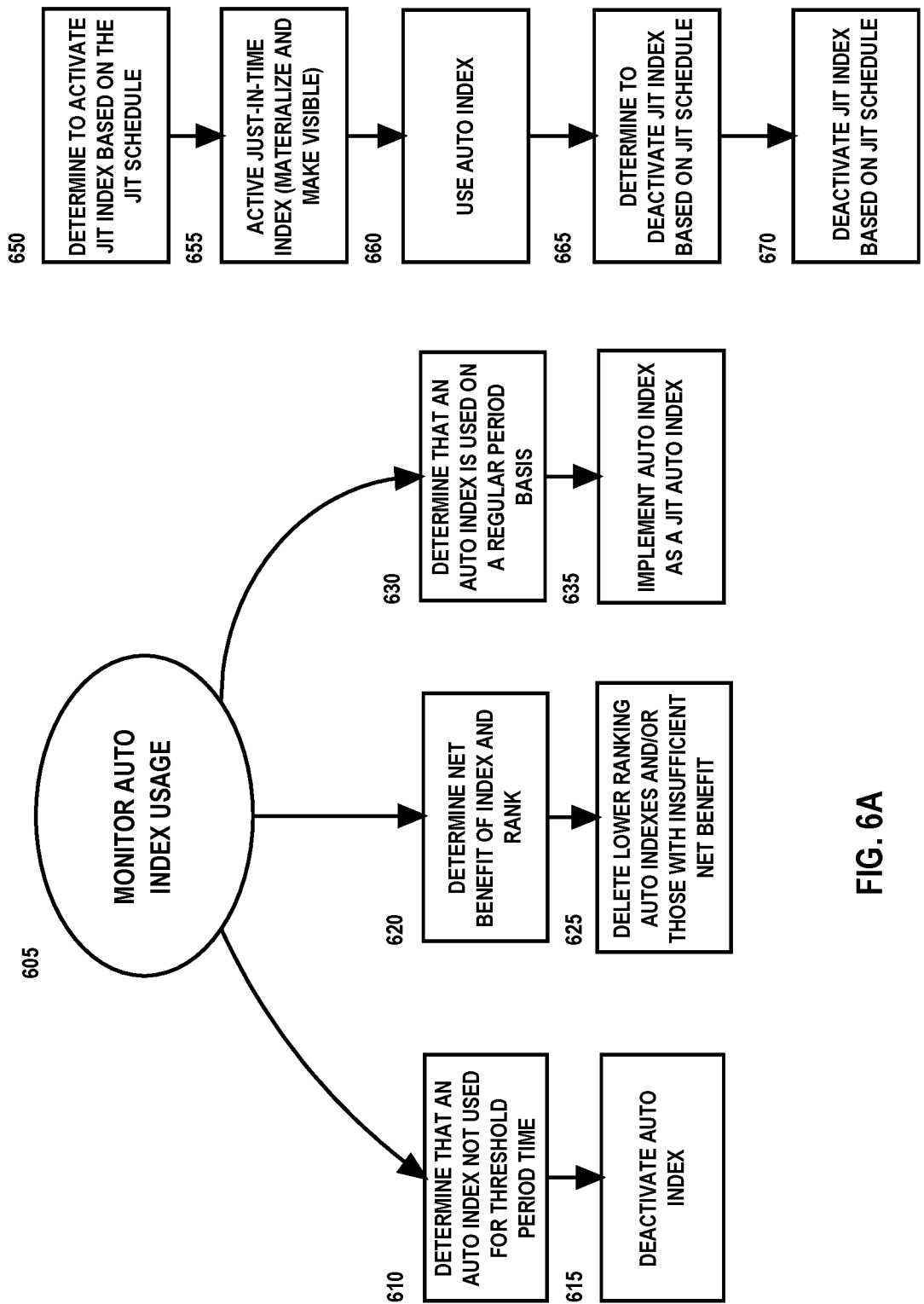

AUTOMATED REAL-TIME INDEX MANAGEMENT

FIELD OF THE INVENTION

The present invention relates to managing indexes in a database management system (DBMS).

BACKGROUND

In DBMSs, indexes are an essential feature to database performance. The importance of index features remains paramount despite advances in alternative performance features such as materialized views and in-memory columnar storage and processing. An optimal mix of indexes minimizes resource utilization (CPU and IO) when fetching a relatively small amount of data from very large tables and increases application throughput.

Because of the importance of indexes, managing a mix of indexes is an important task. In general, managing a mix of indexes includes creating a mix of indexes that provide an optimal performance and maintaining the mix to ensure the mix remains optimal.

The task of creating an optimal mix of indexes requires extensive knowledge of the structure of the database, of the workload of querying and updating the database, and of the internal operations of a DBMS. Additionally, once created, the task of managing the mix to ensure the mix provides optimal performance is onerous, requiring constant monitoring of the workload, database structure changes, and revaluation of the performance provided by indexes in the mix and potential performance provided by potential new indexes to add to the mix. Because the task is onerous, it is often not performed or performed not nearly often enough or incompletely, and the performance provided by the mix of indexes actually implemented degrades.

Described herein are techniques for automated management of indexes. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 6A is a diagram depicting activities for managing auto index usage, according to an embodiment of the present invention.

FIG. 6B is a diagram depicting a procedure for implement just-in-time auto indexes, according to an embodiment of the present invention.

DETAILED DESCRIPTION

In the following description, for the purposes of explanation, numerous specific details are set forth in order to provide a thorough understanding of the present invention. It will be apparent, however, that the present invention may be practiced without these specific details.

General Overview

Described herein are approaches for automating index management, which are referred to herein as Automated Index Management. Automated Index Management entails automated monitoring of query workload in a DBMS to determine a set of high load queries to use to evaluate new potential indexes. Without the need of user approval or action, the potential indexes are automatically created in a state that makes them not used by a database application workload, evaluated and tested, and then made available for system wide use for executing queries issued by end users. Indexes created by Automated Index Management are referred to herein as auto indexes.

Figure 1:
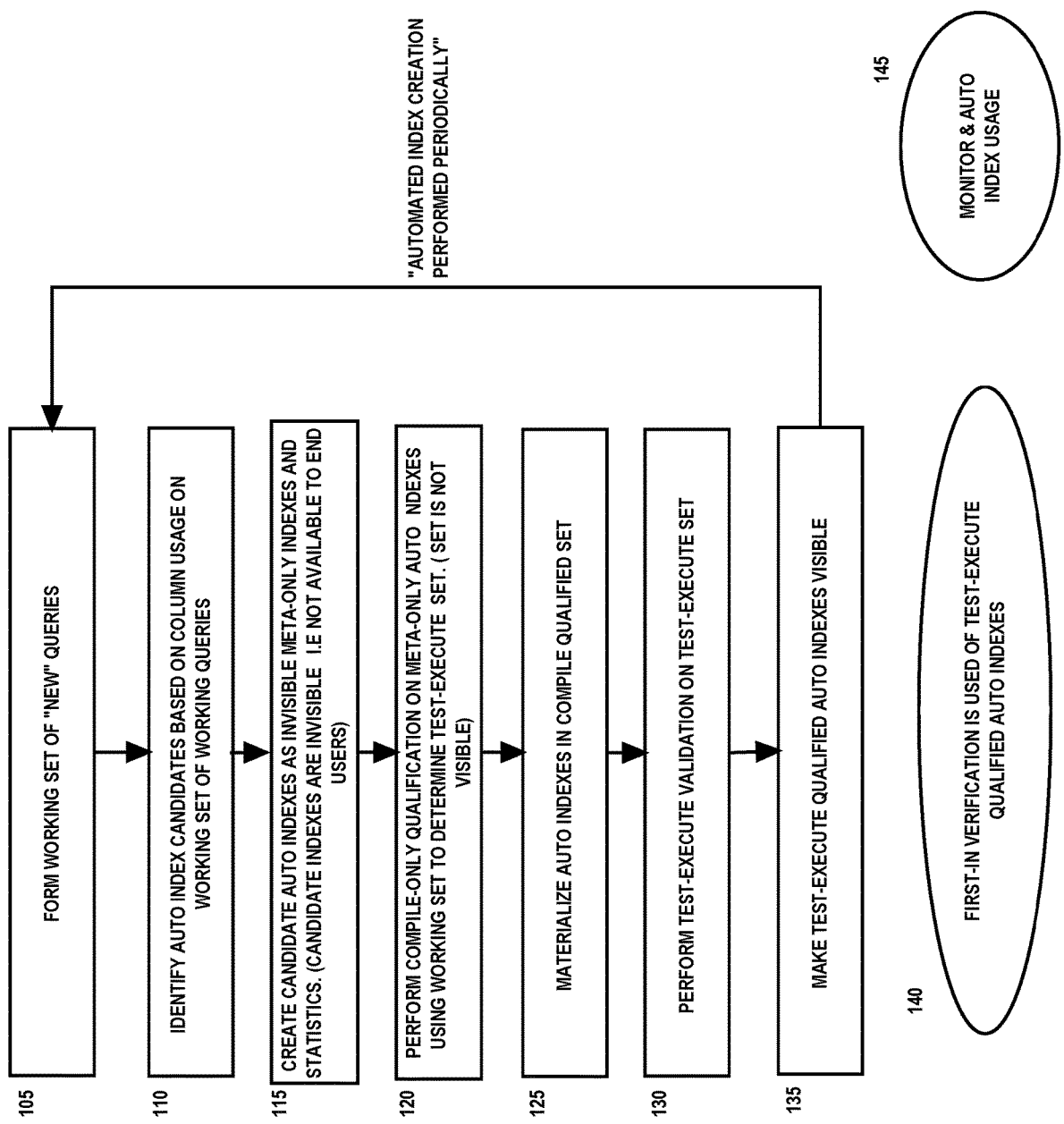
FIG. 1 is a diagram depicting a procedure for automated index management, according to an embodiment of the present invention.

FIG. 1 is a flow chart overview of important operations and activities of Automated Index Management. Referring to FIG. 1, operations 105 through 130 are performed iteratively as a loop to generate new auto indexes. These operations are referred to collectively as Automated Index Creation. Each iteration of the loop may yield new auto indexes, change in the state of the auto indexes, or removal of auto indexes not deemed, in effect, helpful.

At 105, a working set of queries is formed. The working set is formed by monitoring queries executed to determine which are more frequently executed within a threshold period of time. A query is added to the working set if the query has not been added the working set for at least a threshold period of time.

At 110, auto index candidates are identified. According to an embodiment, the candidates are identified by monitoring column usage. Candidates may be new indexes having keys most frequently used as columns in filtering predicates, joining predicates, and other query operations in the working set, such as a order-by or group-by operation.

At 115, the candidate auto indexes are created as meta-only auto indexes. Meta-only auto indexes are defined in a database dictionary but have not been materialized. By not materialized, it is meant that base data ("index data") for the index has not been generated and stored in the database. An example of index data is key values organized in binary tree form. Index statistics may be collected for meta-only auto indexes. By defining auto indexes in this way, when a query is compiled, one or more candidate execution plans may be generated that use the meta-only auto indexes even though the indexes are not materialized.

The meta-only auto indexes are also created as invisible indexes. Invisible indexes are not considered by a DBMS when compiling queries issued by a database application or end users.

At 120, compile-only qualification is performed on each query in the working set. In compile-only qualification, each query in the working set is compiled by the DBMS. When compiling the queries in the working set, the compilation considers meta-only auto indexes and other existing indexes. The compilation may generate costs for execution plans that include meta-only auto indexes and execution plans that do not. Generally, the execution plan with the least cost is selected. If a compilation selects an execution plan for a query that uses a meta-only auto index, then the meta-only auto index has been qualified for the query. Any auto index qualified for any query in the working set is added to the "compile-qualified set".

At 125, the meta-only auto indexes in the compile-qualified set are materialized. Even though materialized, the auto indexes remain invisible so that the auto indexes are not used for end user queries. This prevents the use of an auto index that could degrade performance until the potential for increasing performance is confirmed.

At 130, test-execute verification is performed on the materialized compile-qualified set. Test-execution verification involves executing queries in the working set to determine whether use of an auto-index actually improved performance execution of a query. Auto-indexes that improve execution of any query in the working set are test-execute qualified.

It is possible that an auto-index may improve execution of a query in a working set but degrade execution of another query in a working set. In this situation, the auto index may be considered test-execute qualified, but in a limited way, because the use of the auto index is prevented for execution of the other query. When the use of an auto index is prevented for use in execution of a specific query, the auto index is referred to herein as being locked down for that query.

At 135, test-execute qualified auto-indexes are made "visible", meaning, compilation of queries issued by end users considers the auto-indexes and may generate execution plans that use the auto indexes.

Test-execute verification only prevents the use of auto-indexes that degrade query execution for queries in the working set. However, once made visible, the auto indexes may degrade query execution for queries that are not in the working set. Accordingly, for such a query, a mechanism referred to herein as first-in verification is used to determine whether the use of the auto-index improves performance query execution of the query. (140)

In first-in verification, the first one or more times an execution plan uses an auto index for a query, the execution plan is tested to verify whether query execution for the query is improved or degraded. Use of the auto index is prevented for subsequent compilations of the query. Thus, when a database session compiles a query that generates an execution plan that is the first to use an auto index, the execution plan is tested. For one or more other database sessions that may compile the query concurrently or subsequently, use of the auto index is prevented for compilation of the query.

The query execution of the execution plan that uses the auto index is evaluated. If query performance is degraded, the auto index is locked down for the query, thereby preventing degraded query execution for the query by other database sessions and users.

Auto indexes are monitored. If not used, the auto indexes are deactivated. (145)

Identifying and Creating Meta-Only Auto Indexes

Figure 2:
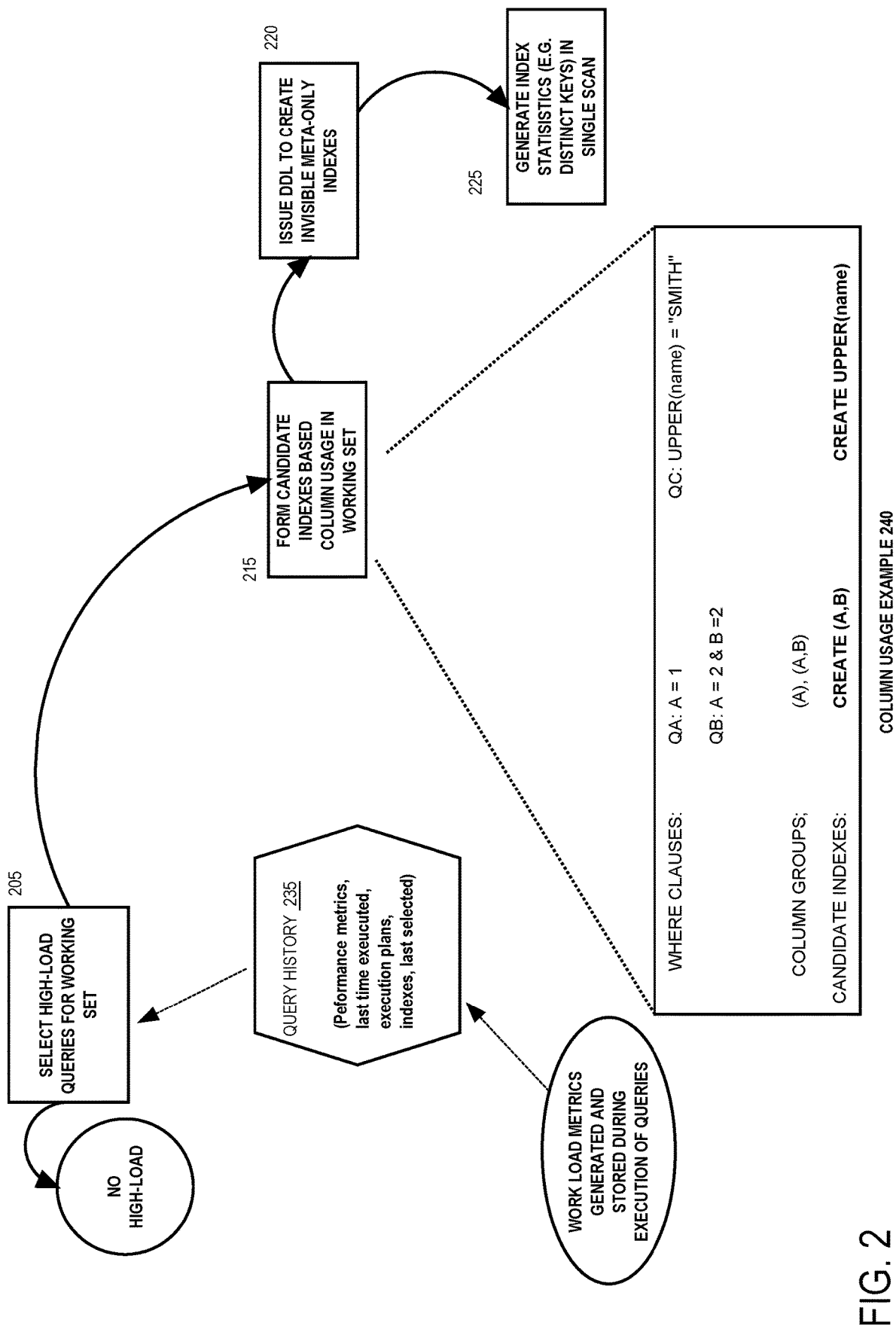
FIG. 2 is a diagram depicting a procedure for identifying and generating meta-only auto indexes, according to an embodiment of the present invention.

FIG. 2 is a procedure flow diagram depicting further details of identifying meta-only auto indexes. Once identified, the procedure creates the meta-only auto indexes.

Referring to FIG. 2, high-load queries are selected. (205) High-load queries are identified by examining query history 235. Query history 235 is a repository within a DBMS that tracks execution of queries, including performance metrics, and when recently executed and last selected as a high-load candidate for the working set. Criteria for selection can include that (a) a query have at least a certain threshold of workload (as measured in terms of performance metrics) within a window of time, (b) that a query is a new query, i.e., was recently not selected for a working set within a threshold period of time, and (c) that the workload of the query has a threshold rank compared to other queries recently executed. It is possible that no queries are selected.

Information in query history 235 is generated, in least in part, by database processes executing queries within a DBMS. For each query, query history 235 may include (a) performance metrics for executions of the query, including number and average of buffer accesses, I/O reads, rows processed, CPU processing time, and elapsed execution time, (b) last times executed (c) executions plans used, including which indexes were used and evaluated by compilation, (d) and when the query was last selected for the working set.

At 215, a candidate set of auto indexes is formed by examining the column usage of queries in the working set. In general, indexes formed are those that have keys that correspond to distinct groups of one or more columns in WHERE clause filter predicates ("filter predicates") and join predicates and for which indexes are not already defined in the database dictionary. The auto indexes may be formed for each group of columns having a column that is referenced in a conjunct of a filter predicate or join predicate. Each group of columns may represent a key or compound key for a potential auto index.

An auto index may be created for each distinct group of columns. However, when one auto index may be used for multiple groups of columns, then only one auto index may be created, as illustrated below. Creating fewer auto indexes conserves storage resources and reduces processing to maintain indexes (CPU and I/O) when modifying tables indexed by the auto-indexes.

To illustrate how a candidate set is formed, column usage example 240 in FIG. 2 is provided. In column usage example 240, column A is referenced in filter predicate A=1 in query QA and predicate A=2 & B=2 in query QB. Thus, queries QA and QB reference column groups (A), and (A, B). An auto index can be generated for each group, i.e., an auto index with (A) as an index key and another auto index with a group (A,B) as an auto index key (i.e., compound key).

However, an index with a compound key (A,B) can also be used as an access path for a predicate on just A, as in query QA. Thus, only one auto index with the compound key (A,B) is added to the candidate index.

Functional Auto indexes may also be created on a function that is applied to a column. For example, QC includes the predicate UPPER(name)="SMITH". A functional auto index that applies the function UPPER on column name may be added to the candidate list.

At 220, data definition language commands ("DDL") are formed and executed to create meta-only auto indexes that are invisible. The DDL commands include parameters and/or clauses that specify, among other things, the key of the index, that the auto index is an auto index, is invisible, and is not be materialized. A database dictionary for the DBMS is updated accordingly to define an index marked as an auto index that is invisible and is not be materialized.

At 225, index statistics are generated. In general, index statistics for an index is generated by performing "index statistics scan" of rows in a table, and for each of the rows, examining column values in the index key. One particularly important index statistic that can be generated is the number distinct key values for the key of the index. From the number of distinct key values, other index statistics may be generated. For example, the number of data blocks needed to store the index can be estimated from the number of rows in the table, the number of distinct key values, and the size of the key.

According to an embodiment, a single index statistics scan on the table is performed for a group of multiple auto indexes. Each row of rows of a table is read, and the columns of the keys for a group of auto indexes are examined to generate index statistics for each auto index in the group.

Outside the context of Automated Index Creation, as described herein, an index statistics scan is performed individually for each creation of an index, in response to, for example, a DDL command requesting creation and materialization of an index on a table. Thus, a single index statistics scan, by performing a table scan for multiple auto indexes on the table instead of multiple index statistics scans, reduces use of computer resources (e.g. processing time, I/O) for generating index statistics for multiple indexes.

Compile-Only Qualification

Figure 3:
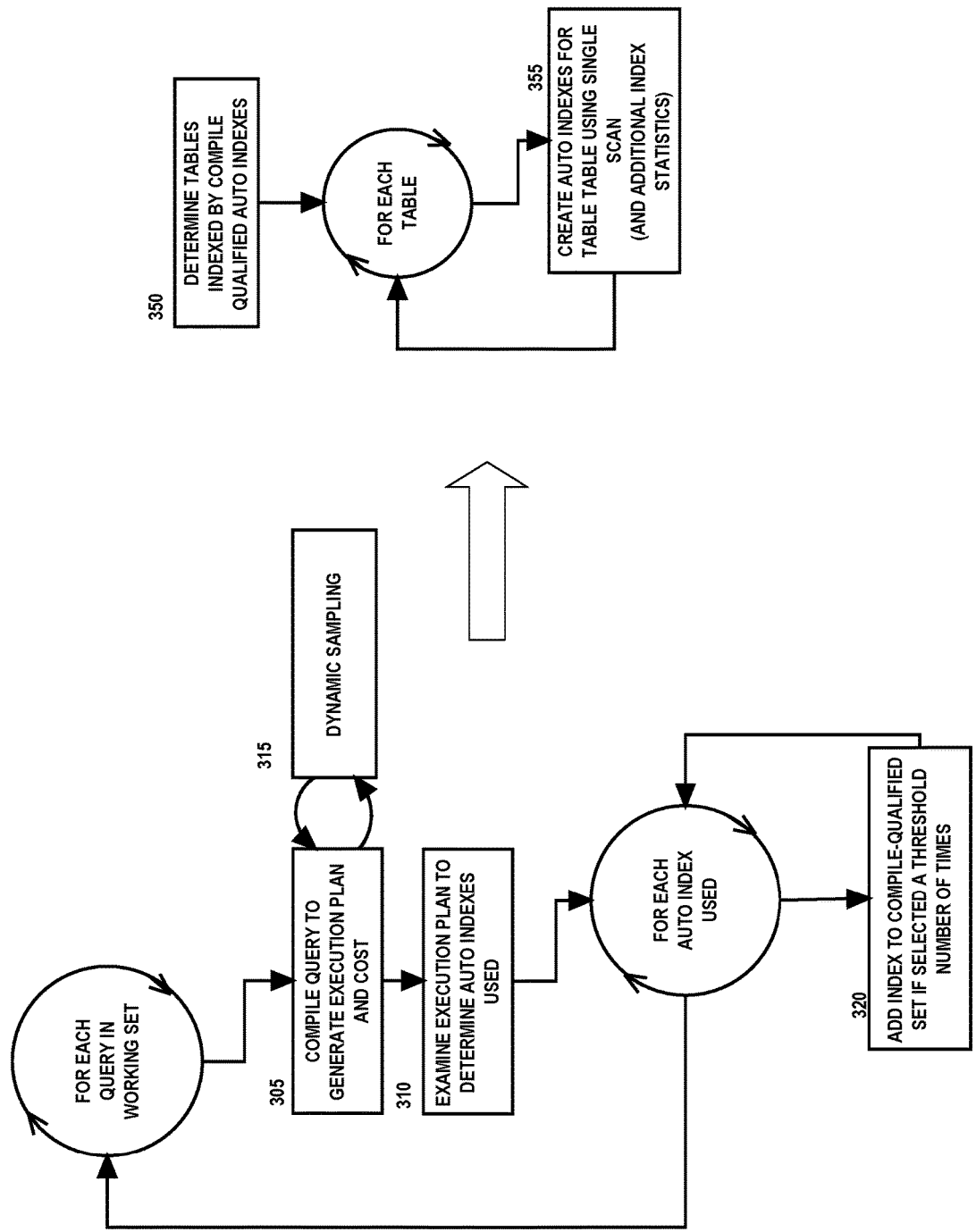
FIG. 3A is a diagram depicting a procedure for compile-only qualification of meta-only indexes, according to an embodiment of the present invention.
FIG. 3B is a diagram depicting a procedure for compile-only qualification of meta-only indexes, according to an embodiment of the present invention.

After the meta-only auto indexes are defined, compile-only qualification is performed to determine which meta-only auto indexes to materialize and to test execute. In compile-only qualification, a query in the working set is compiled to determine whether any of the meta-only auto indexes are selected for the execution plan generated by the compilation. FIG. 3A depicts a procedure for compile-only qualification, according to an embodiment of the present invention.

Referring to FIG. 3A, for each query in the working set, the query is compiled to generate an execution plan. (305) Compiling the query may use index statistics previously generated for the auto index. The query execution plan of the query is examined to determine which auto indexes are selected for use in the execution plan. (310)

Each auto index selected a threshold number of times is added to the compile-qualified list. (320) The threshold number may be one or greater than one. For example, if the threshold number is two, then if during compile-only qualification an execution plan for two o more queries in the working set selected an auto index, then the auto index is added to the compile-qualified list.

According to an embodiment, during compilation of a query, dynamic sampling statements can be performed to determine the selectivity of any predicate on one or more columns of a key of an auto index. (315) The results of dynamic predicate sampling are used to determine whether to use an auto index. When dynamic sampling statements is used for an auto index, generation of index statistics at 225 may be foregone. Alternatively, during compilation of a query, both index statistics on the auto index and query sampling statements may be used. Dynamic sampling statements is described in U.S. Pat. No. 7,213,012, Optimizer Dynamic Sampling, filed on May 9 2003 by Hakan Jakobsson, et al. as U.S. patent application Ser. No. 10/435,228, the entire contents of which are incorporated herein by reference.

Materializing Auto Indexes

After compile-only qualification is completed, the compile-qualified indexes are materialized so that the compile-qualified auto indexes may be test executed.

FIG. 3B depicts a procedure for materializing compile-qualified auto indexes. Similar to the single scan approach used to generate index statistics scans, a single table scan approach is used to generate multiple compile-qualified auto indexes for a table. Referring to FIG. 3B, the one or more tables indexed by the compile-qualified indexes are determined so that a single index creation scan approach may be applied. (350)

For each table, a single index creation scan is performed to generate index data for all compile-qualified auto indexes on the table. (355) Performing the scan may entail extracting the key values needed to form index data for all compile-qualified auto indexes of the table. Some types of indexes do not actually store key values in the index data, but the key values need to be examined to determine how to create the index. For example, a bitmap index may entail setting a bit in a bitmap that corresponds to a row containing a particular key value.

Also, additional index statistics may be generated during the single index creation scan. For example, when generating a B-tree index, information such as the depth of the B-tree, the number of non-leaf nodes, and the number of leaf nodes is generated.

Outside the context of Automated Index Creation, an index creation scan is performed individually for each creation of an index, in response to, for example, a DDL command requesting creation and materialization of an index on a table. Thus, the single index creation scan approach described herein, by performing one index creation scan for multiple indexes on a table instead of multiple index creation scans, reduces computer resources (e.g. processing time, I/O) required to materialize multiple indexes on the same table.

Test-Execution Verification of Compile-Qualified Auto Indexes

Compile-only qualification establishes that an auto index may improve query execution performance based on an estimation of performance metrics for an execution plan. Test-execute verification confirms that an auto index has actually improved execution of a query.

To determine whether execution of a query is improved, performance metrics are needed about previous executions of the query for purposes of comparison. Such information is obtained from query history 235.

Figure 4:
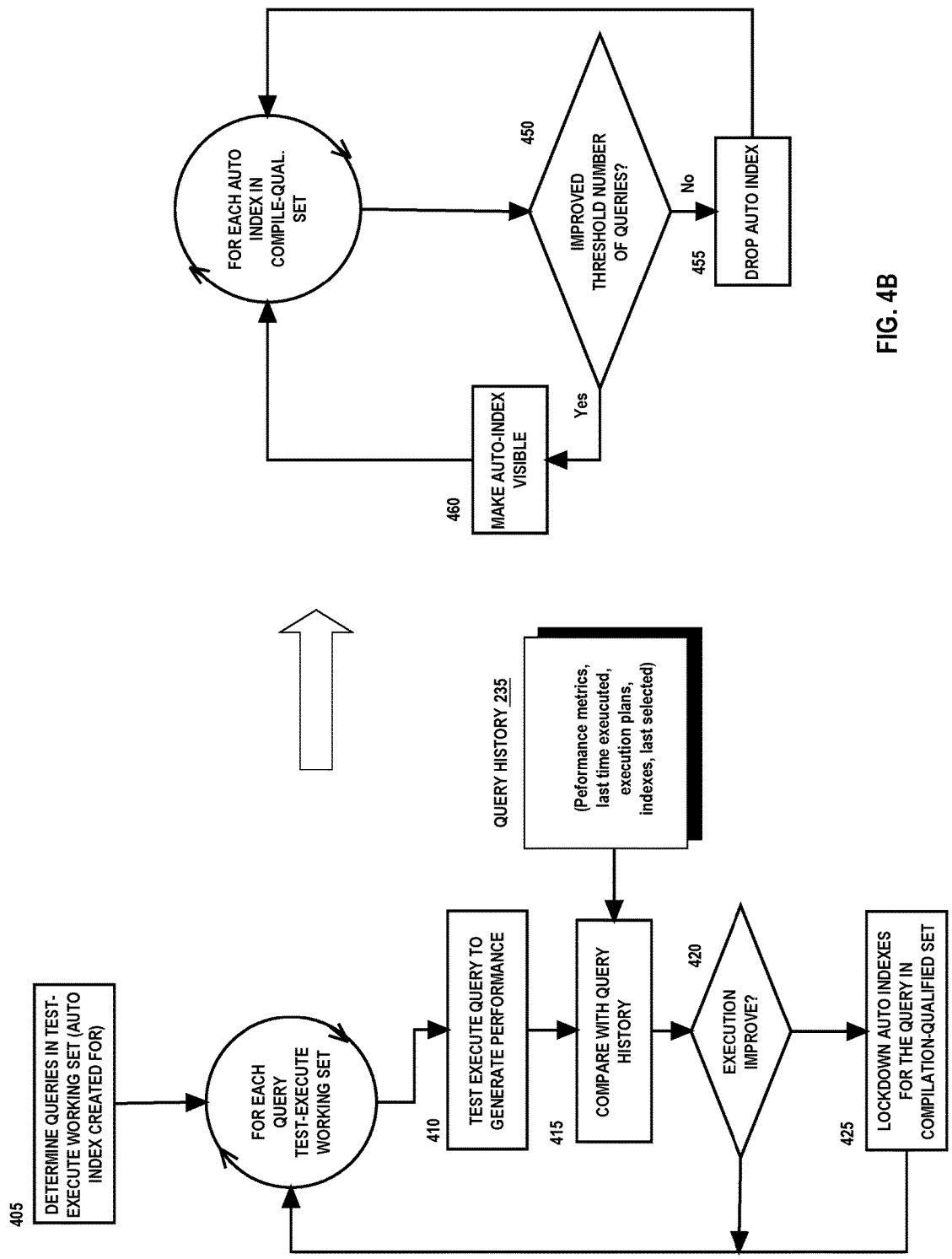
FIG. 4A is a diagram depicting a procedure for test-execute verification, according to an embodiment of the present invention.
FIG. 4B is a diagram depicting a procedure for making auto-indexes available are test-execute verification, according to an embodiment of the present invention.

FIG. 4A depicts a procedure for test-execute verification. Referring to FIG. 4A, the members of the test-execute working set are determined (405), which are the queries in the working set for which a generated execution plan used an auto index during compile-only qualification. Test-execute verification is performed on the queries in the test-execute working set.

For each query in the test-execute working set, the query is test executed to generate performance metrics. The performance metrics are compared to performance metrics for the query stored in query history 450. (415) In general, the performance metrics used for comparison are the performance metrics of the most recent execution plan in the query history 450 for the query.

Based on the comparison, it is determined whether the test execution improved or degraded query execution performance. (420) If the performance degraded, then any of the compile-qualified auto indexes used in the test execution are lockdowned for the query. (425) For example, the execution time for test execution of a query may be greater than the execution time for the query in the query history 450, thereby showing query execution performance degraded.

Lockdown of Queries

According to an embodiment of the present invention, a query is locked down using a "SQL lockdown". A SQL lockdown is built on top of a SQL management object. SQL management object influences the way a DBMS compiles a query. Compilation of a query may generate a suboptimal execution plan for the query. For example, the compilation may generate a suboptimal execution plan for a query that may use an index when another execution plan that did not use the index would be more optimal.

To avoid compiling a suboptimal execution plan for the query, a SQL management object is generated for the query and is used by a DBMS to influence how a query is compiled, which may avoid using a suboptimal execution plan. A SQL management object may be generated automatically by monitoring performance of queries. A SQL management object is the underpinning of SQL profiles. The Automated generation of a SQL profile is described in U.S. Pat. No. 7,664,730, Method and system for implementing a SQL profile, filed on Sep. 7, 2004 by Mohamed Ziauddin, et al. as U.S. patent application Ser. No. 10/936,205, the entire contents of which are incorporated herein by reference.

An important feature of an SQL lockdown is that an SQL lockdown enables automated configuration of a DBMS to improve performance at a query-specific level. If an automatically generated SQL lockdown degrades performance of a query, the degradation is limited to that query.

On the other hand, a configuration change like creating an index has a system wide effect. Adding an index can potentially degrade the performance of many queries. Hence it is important that an approach for automatically creating auto indexes use measures that prevent the use of the auto index for a query when doing so degrades the performance of that query. Hence, a SQL lockdown is used to prevent the use of an auto index the Automated Index Management finds degrades query execution of a query, as explained later below.

Making Auto Indexes Available

Once test-execute verification is completed, any compile-qualified auto index shown by text-execute verification to have improved query execution of a threshold number of queries may be made available for future executions of queries. FIG. 4B shows a procedure used for making auto indexes available in this way.

Referring to FIG. 4B, for each compile-qualified auto index, it is determined whether the auto index improved query execution for a threshold number of queries. If not, then the auto index is dropped (455), thereby removing the auto index from the database dictionary of the DBMS and removing the index data of the auto index from the database. The threshold may be one or more.

If it is determined the auto index improved query execution for a threshold number of queries, the auto index is made visible. A query optimizer may consider an auto index for any future execution of other queries other than the queries in the working set.

First-in Verification

Test-execute verification verifies that an auto index improves execution for at least one query in the working set. For execution of a query in the working set that the auto index did not improve, test-execute prevents that auto index from degrading execution of that query. However, an auto-index may degrade query executions of queries not in the working set. To address this possibility, query execution performance is verified for a query when an auto index is initially selected for an execution plan for the query. Before query execution verified for the query, the query is referred to herein as an unverified query.

To determine whether an auto-index may degrade or improve query execution performance of an unverified query, first-in verification is used. In general, after the initial one or more times compilation of query generates an execution plan that uses an auto index, the auto index is prevented for use in subsequent compilations of the query. The execution of the query with the auto index is evaluated to determine whether query execution of the query improved or degraded. If improved, the DBMS does not subsequently prevent the use of the auto index for the query. If degraded, the auto index is locked down for the query. Thus, first-in verification limits query execution degradation that is due to an auto index to one or a few executions of the query, while making an auto index available for execution of a query when the auto index improves query execution.

While first-in validation is performed, a DBMS may detect that query execution is running much longer than a previous execution of the query. In response, first-in validation may stop execution of the query, lockdown the auto index, and then recompile and execute the query without the auto index.

Shared Cursor Mechanism

According to an embodiment of the present invention, a shared cursor mechanism of the DBMS is used for first-in verification. A shared cursor mechanism uses a shared cursor pool. A shared cursor mechanism is explained in reference to FIG. 5, which depicts first-in verification using a shared cursor mechanism.

Figure 5:
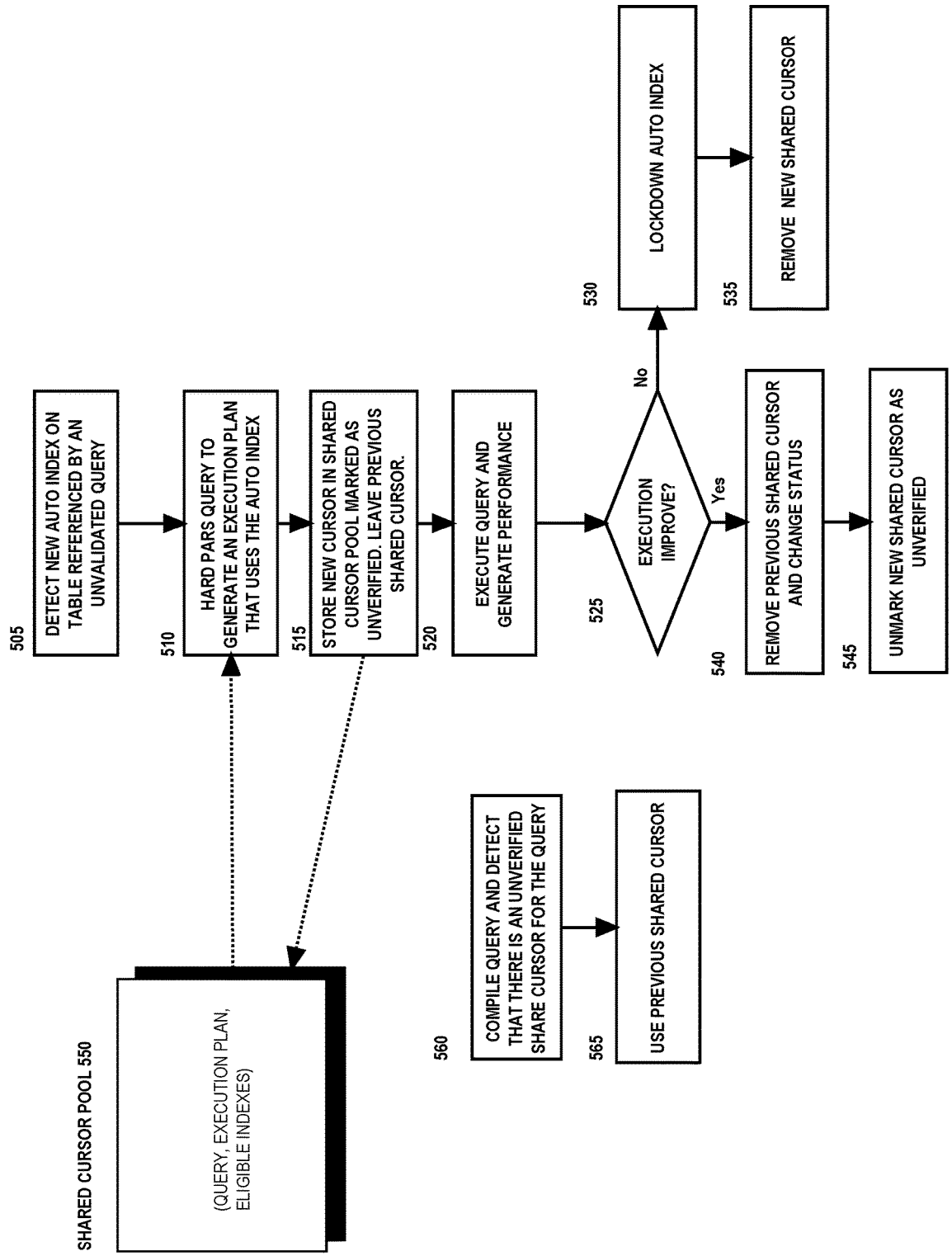
FIG. 5 is a diagram depicting a first-in verification implemented based on a shared cursor pool mechanism, according to an embodiment of the present invention.

Referring to FIG. 5, it depicts shared cursor pool 550. A shared cursor pool stores shared cursors that can be accessed by database sessions running a DBMS. A cursor is generated by compilation and includes an execution plan for a query. The cursor is a data structure that stores the execution plan and information about the query and the compilation of the execution plan, such as an operator tree, and a list of eligible indexes. Eligible indexes are indexes on the table and column referenced by a query that were eligible for the query at the time of compilation. An index is eligible for a query when, for example, the index may be used to evaluate a predicate on a key, and the index is visible and not locked down for the query.

When a query is compiled by a query optimizer, the query optimizer looks up the query in the shared cursor pool. If there is a shared cursor for the query, then the execution plan stored in the shared execution plan is used for the query. Using an execution plan in this way for a query is referred to herein as a "soft parse". Otherwise, the query optimizer performs a "hard parse", generating the execution plan from "scratch".

When a hard parse is performed, a shared cursor for the query is stored in shared cursor pool 550. Any previously shared cursor for the query previously stored in shared cursor pool 550 is removed from the shared cursor pool 550. Removing the shard cursor may entail marking the shared cursor as invalid to prevent use of the shared cursor. A hard parse may be performed when the query optimizer determines from the eligible index list in the shared cursor for the query that there is a new index not in the eligible index list.

However, under first-in verification, when a hard parse is performed in response to detecting an eligible new auto index, the previous shared cursor in shared cursor pool 550 may not be removed so that the shared cursor may be used for a subsequent execution of the query. A shared cursor using the auto index (i.e. a shared cursor storing an execution plan that uses the new auto index) may be added to shared cursor pool 550 but is marked as under validation to prevent use of the shared cursor for another execution of the query. If query performance of the new execution plan is validated as having improved, the new shared cursor is unmarked and the previous shared cursor removed.

It should also be noted that when an auto index is created or rebuilt, shared cursors for queries that reference the table of the auto index are not removed from the shared cursor pool. Such shared cursors remain in the shared cursor pool available for the respective queries, including during first-in verification as shown above. When an index that is not an auto index is created or rebuilt, the shared cursors for queries that reference the table of the index may be removed from the shared cursor pool.

Shared Cursor Based First-in Verification

FIG. 5 depicts a diagram depicting first-in verification that uses a shared cursor mechanism. Referring to FIG. 5, a new eligible auto index is detected for a query. The new auto index was detected by examining the shared cursor in shared cursor pool 550 for the query and determining the auto index is not in the eligible index list in the shared cursor. (505)

The query is hard parsed to generate an execution plan that uses the auto index. (510) A new shared cursor for the query and new execution plan are stored in shared cursor pool 550 and marked as under validation. The query is executed using the new execution plan with the auto index. Performance metrics are generated by execution of the query. (520)

While the query is being executed with the new execution plan, the query is compiled again for another execution of the query. The unverified status of the new shared cursor is detected during compilation. (560) In response, the new shared cursor is ignored and the previous execution plan in the previous shared cursor is used to execute the query. (565)

After execution of the new execution plan, it is determined whether execution performance has degraded or improved. Performance metrics for the previous execution plan are retrieved and compared to the performance metrics for the new execution plan.

If execution performance degraded, the auto index is locked down for the query. (530) The new shared cursor is removed from shared cursor pool (535).

If execution performance improved, the previous shared cursor is removed from shared cursor pool 550. (540) The new shared cursor is unmarked as under validation. Subsequent executions of the query may thus use the new shared cursor and realize improved query execution performance.

When compilation of a query uses the new auto index for the first time and there is no shared cursor for the query, then a new shared cursor is built and marked as under-validation. In this situation, whether an auto index was ever used for the query may be determined by examining query history 235.

When another database session compiles the same query, the shared cursor marked as under-validation is not used. A new cursor that does not use the new auto index is built, which in turn can be shared by other users executing the same query.

Managing Auto Index Usage

Managing auto index usage is performed to deactivate auto indexes that are not used and/or infrequently used, or that provide insufficient or no cost benefit. Such auto indexes are referred to herein as low value auto indexes. An auto index may become a low value auto index because, for example, SQL lockdowns automatically generated over a period of time may prevent use of the auto index. Changes to index statistics may also be a cause. Other factors include: change in the volume of the table data, change in the distribution of the index key columns, change in the application, change in the data model (or schema). Deactivating an auto index entails making the auto index invisible and/or dematerializing the auto index. Also, the auto index may be dropped, removing the auto index from the database dictionary of DBMS.

Deactivating an auto index may save on storage space that would otherwise be occupied by the index data of the auto index. Also, deactivating an auto index reduces the number of indexes considered when compiling a query, which reduces query compilation time and work. Also, deactivating an auto index reduces the maintenance cost for modifying a table.

In an embodiment, the deactivated auto index is left materialized but is not maintained. However, the auto index is eligible for Automated Index Creation. In this case, for test-execution of the query, the already materialized index may be incrementally rebuilt to reduce the cost of materializing the auto index.

FIG. 6 depicts activities performed as part of managing auto index usage. Referring to FIG. 6, auto index usage is monitored. (605) Auto index usage is monitored by examining query history 235 on a periodic basis. Based on the examination, it is determined whether an auto index has not been used for a threshold period of time. In response to this determination, the auto index is deactivated. (615)

For example, a DBMS may examine the execution plans in the query history 235 that use a particular auto index. Based on the examination, it is determined that the most recent execution time for the most recently executed execution plan is in the past by at least the threshold period. In response to this determination, the auto index is deactivated.

Deactivating Auto Indexes Providing Insufficient Benefit

The usage of auto indexes is monitored in terms of number of queries for which the auto index is used, the number and frequency of queries benefiting from the auto index and the net benefit (difference between the processing times with the auto index and the processing times without the auto index across all queries). The metrics collected by monitoring are used to rank auto indexes (620). The ranking may be based on the number of queries where the auto index is used, the number and frequency of queries benefiting from the index and the total net benefit across all queries using the auto index. Auto indexes with a threshold lowest rank and/or insufficient net benefit across all queries for which the auto indexes are used may be deactivated.

In an embodiment, the benefits estimated for an auto index accounts for maintaining the auto index. The cost of maintaining an index has three components: (1) storage space, (2) CPU and IO time to create the index, (3) CPU and IO cost to maintain the auto index. The first two components are a one-time cost. The maintenance cost of an index is incurred whenever a table is modified. The cost of the index is measured over a predefined period of time (for example, a week) using the following steps:

(1) When an auto index is made available, a snapshot at time T1 is created of the counters that record the number of rows inserted, deleted, and updated in the table.

(2) Another snapshot of the counters is created after the predefined period of time at time T2.

(3) The maintenance cost is computed using the following formula:

$$(INSERT\_COUNT(T1)-INSERT\_COUNT(T0))*INSERT\_COST+DELETE\_COUNT(T1)-DELETE\_COUNT(T0))*DELETE\_COST+UPDATE\_COUNT(T1)-UPDATE\_COUNT(T0))*UPDATE\_COST)$$

INSERT_COST, DELETE_COST, and UPDATE_COST are constants determined to represent the cost of maintaining index for an insert, delete, or update of a row, respectively.

Just-in-Time Indexes

Based on the examination of query history 235, it may be determined that an auto index is used during a regularly occurring window of time ("regular active window"). (630) For example, an auto index may be used for queries that run monthly to generate monthly reports. Based on the evaluation of query history 235, a DBMS may determine that queries are always executed within a window time at the beginning of the month. The window time is a regular active window for the auto index.

In response to the determination that an auto index is used only during a regular active window, the auto index is implemented as a just-in-time (JIT) auto index. (635) To implement a JIT auto index, a DBMS generates a "JIT schedule" to activate and deactivate the JIT auto index. The schedule activates the JIT auto index just before its regular active window and deactivates the auto index just after the regular active window.

FIG. 6B depicts the regularly scheduled activation and deactivation of a JIT auto index. Referring to FIG. 6B, in response to reaching the beginning of a regular active window defined by the JIT schedule for a JIT auto index, it is determined to activate the JIT auto index. (650)

In response to determining to activate the JIT auto index, the JIT auto index is activated, which entails materializing the JIT auto index and making the JIT auto index visible. (655). As expected, the auto index is used during the active window. (660)

In response to reaching the end of the regular active window, it is determined to deactivate the JIT auto index. (665) In response to determining to deactivate the JIT auto index, the JIT auto index is deactivated. (670)

A benefit of a JIT auto index is that when deactivated the JIT auto index is not maintained, thereby reducing the cost modifying the table. A JIT index is only maintained while activated.

Database as a Service—Container DBMS

In Database as a Service (DBaaS), consumers use a database server or DBMS that is running within a cloud infrastructure. Advantageously, a DbaaS provider manages or controls the underlying cloud infrastructure, applications, and servers, including one or more database servers. DbaaS can be very cost effective, saving consumers substantial time and expense.

A powerful platform for implementing DBaaS is a multitenant architecture referred to herein as a container DBMS (CDBMS), which is described below. To further enhance the effectiveness of DbaaS, Automated Index Management may be provided as a service on a CDBMS.

Figure 7A:
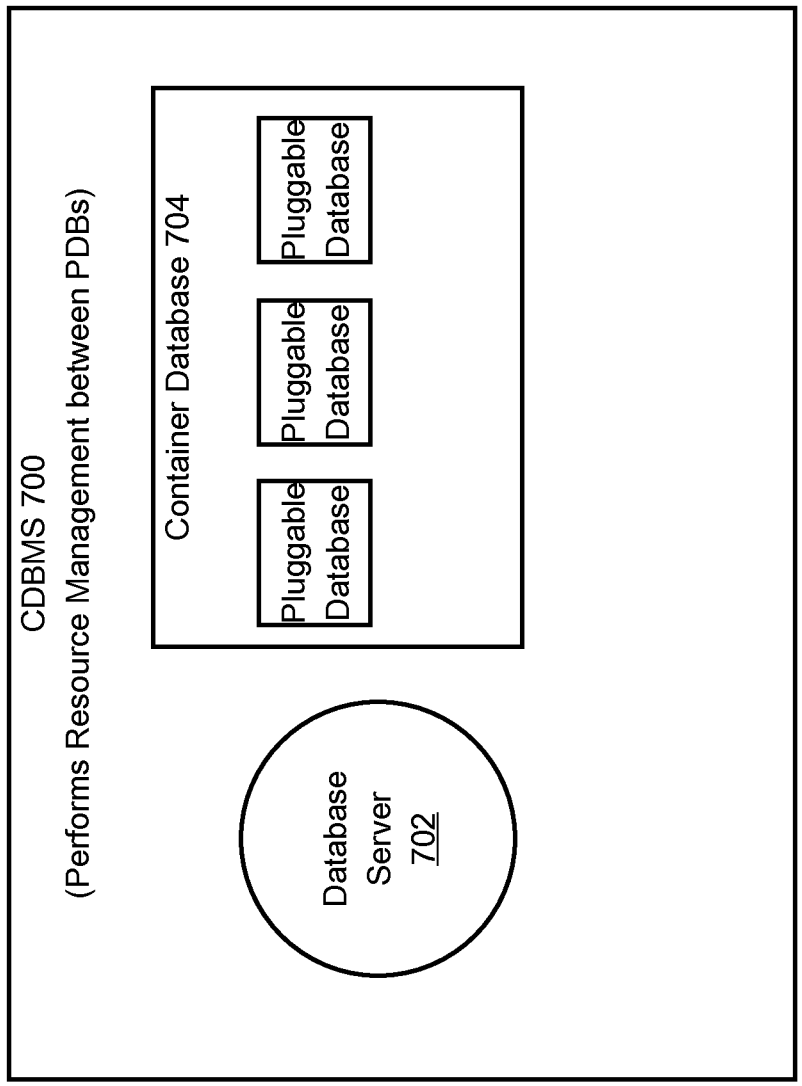
FIG. 7A is a diagram depicting a container database management system, according to an embodiment of the present invention.

FIG. 7A depicts an example of a CDBMS upon which an embodiment of the present invention may be implemented. Referring to FIG. 7A, CDBMS 700 comprises database server 702 and container database 704. An example of a database server and computer system upon which a database server may run are described in the "Database System Overview" and "Hardware Overview" sections described below, although embodiments are not limited to these exact platforms.

Figure 7B:
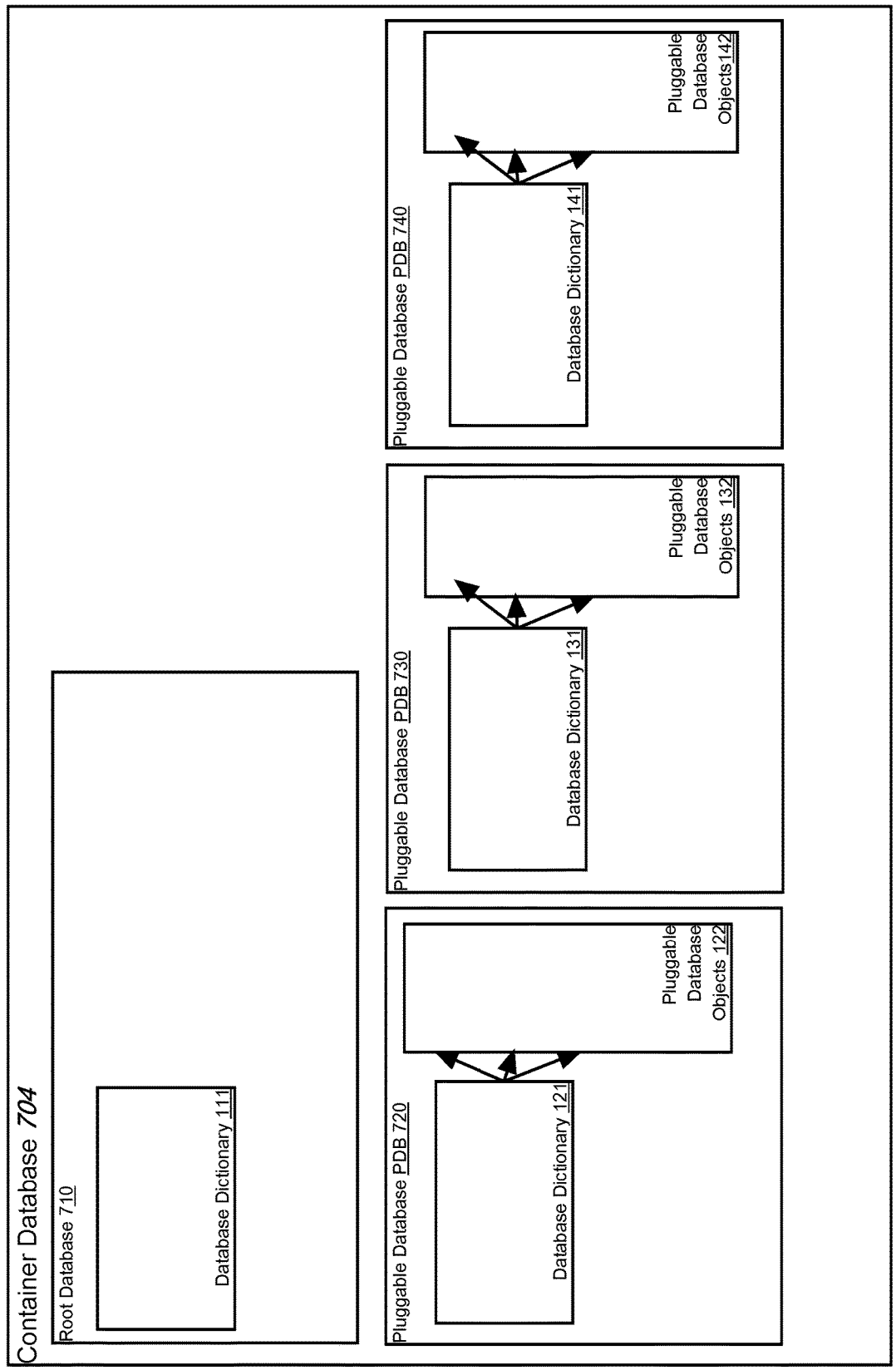
FIG. 7B is a diagram depicting a container database management system, according to an embodiment of the present invention.

FIG. 7B depicts a more detailed view of container database 704 according to an embodiment. Container database 704 contains multiple databases that are hosted and managed by database server 702. The databases include root database 710, and pluggable databases (PDBs) 720 to 740. Root database 710 is a database that is used by the Database Server 702 to globally manage container database 700, and to store metadata defining pluggable databases and/or defining common database objects that may be shared by database sessions running against different pluggable databases that belong to the same container database.

Each pluggable database includes its own database dictionary. PDB 720 includes database dictionary 721, PDB 730 includes database dictionary 731, and PDB 740 includes database dictionary 741. A database dictionary of the pluggable database may be referred to herein as a pluggable database dictionary. A database object defined by a pluggable database dictionary that is not a common database object is referred to herein as a pluggable database object. Pluggable database objects 722, which are defined by database dictionary 721, are database objects that belong to PDB 720 and are not shared by other PDBs. Similarly, database dictionary 731 defines pluggable database objects 732 that belong to PDB 730, and database dictionary 741 defines pluggable database objects 742 that belong to PDB 740.

One function facilitated by root database 710 is to define pluggable databases within container database 700. Similar to pluggable databases, root database 710 includes database dictionary 711. Database dictionary 711 contains metadata that defines various aspects of container database 700 needed to administer container database 700 and the pluggable databases contained therein, including metadata that defines PDB 720, PDB 730, and PDB 740.

Resource Management

Automated Index Management uses computer resources. To ensure the Automated Index Management has sufficient computer resources or does not cause an undesirable amount of overhead by consuming too many computer resources, the computer resources used by Automated Index Management is managed by the resource management capability of the CDBMS 700. Through this capability, CDBMS 700 can manage resources used by a database processes performing Automated Index Management for any of PDB 720, PDB 730, and PDB 740. A resource management mechanism for managing resources in DBMS is described in U.S. patent application Ser. No. 15/249,979, Efficient Hybrid Parallelization For In-Memory Scans, filed by Teck Hua Lee, et al. on Aug. 29, 2016, the entire contents of which are incorporated by reference. A resource management mechanism for managing the resources used for a PDB is described in U.S. patent application Ser. No. 16/166,035, Intelligent Pooling of Isolated Hierarchical Runtimes for Cloud Scale Databases in Multi-tenant Environment, filed on Oct. 19, 2018 by Ravi Shankar Thammaiah, et al., the entire contents of which are incorporated by reference.

Resource management for Automated Index Management may be performed using the "shared allocation approach". Under the shared allocation approach, a quota of computer resources is allocated to a particular PDB, and a portion of the quota is allocated to a background database process that performs Automated Index Creation for the PDB. For example, within CDBMS 700, PDB 720 is allocated a quota of 12 CPU cores. A background database process performing Automated Index Creation is allocated a quota of 1 of these 12 CPUs.

Figure 8:
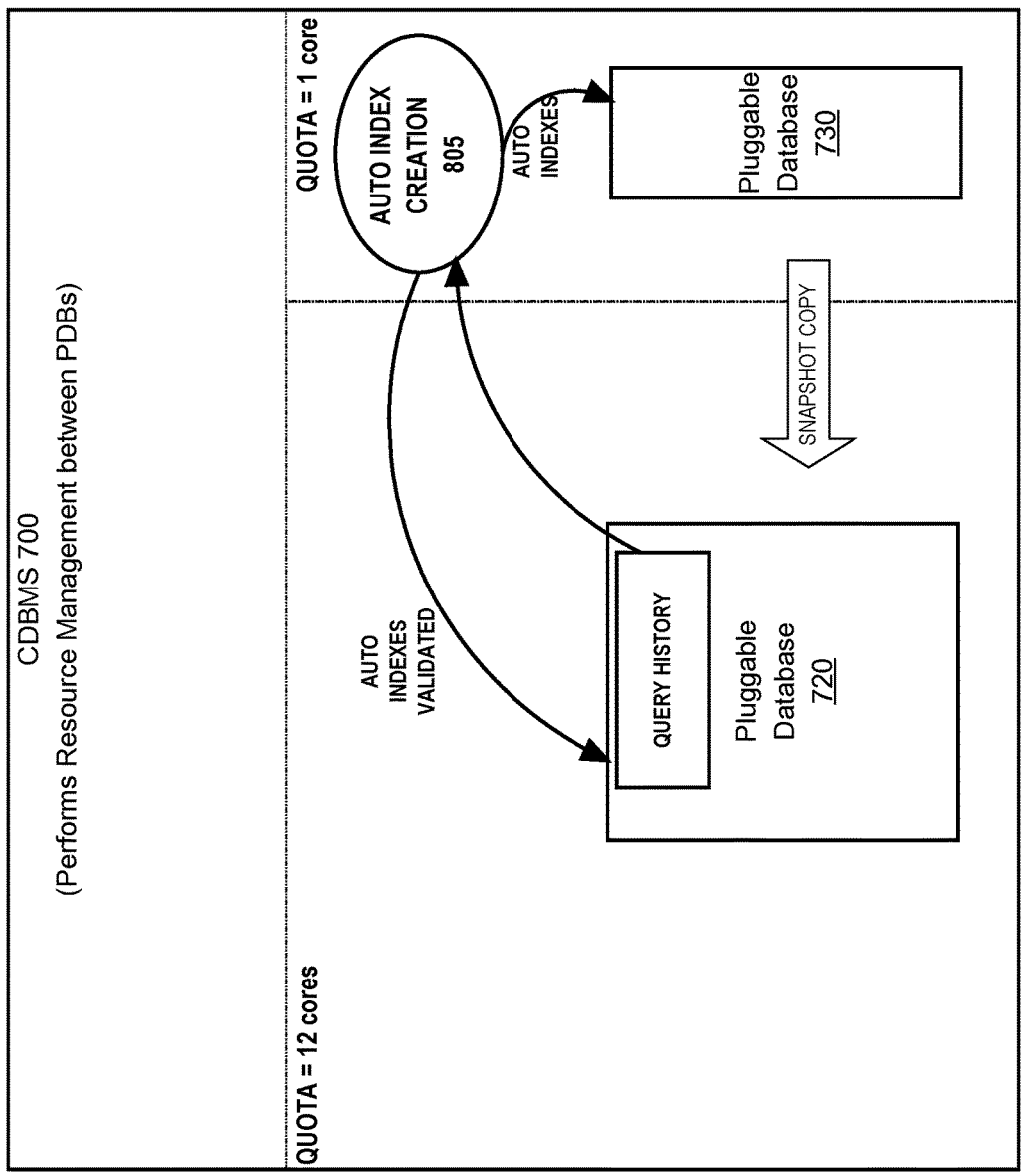
FIG. 8 depicts an approach for implementing automated index management in a container database management system, according to an embodiment of the present invention.

In a "Deallocated Approach" Automated Index Management is performed on a separate PDB clone of a primary PDB. Auto-indexes created by Automated Index Management are propagated to the primary PDB. FIG. 8 is a diagram that depicts the Deallocated Approach.

Referring to FIG. 8, PDB 730 is a snapshot database copy PDB 720, and thus referred to herein as a snapshot PDB. Initially, when PDB 730 is created as a snapshot database copy, snapshot PDB 730 occupies very little storage. As changes are made to either snapshot PDB 730 or PDB 720, a delta comprising differences between the snapshot database copy and the base database is created. Specifically, a snapshot database copy includes pointers to data blocks (or ranges of data blocks) in the base database, and when initially created, the snapshot database copy almost entirely comprises pointers to data blocks. The delta may comprise data blocks storing the changes to a snapshot database copy or a base database. Thus, after the changes are made, the snapshot database copy comprises pointers to data blocks in the base database and at least a portion of the delta. Because the pointers and delta together may comprise substantially less data than a completely materialized copy of the base database, significant storage is saved when creating a snapshot database copy. Creating snapshot database copies in a CDBMS is described in U.S. application Ser. No. 14/313,926, Storage Integrated Snapshot Cloning For Database, filed on Jun. 24, 2014 by Margaret Susairaj, et al., the entire contents of which are incorporated herein by reference.

In FIG. 8, database processes running against PDB 720 are allocated a quota of 12 CPU cores while database processes running against snapshot PDB 730 are allocated a quota of 1 core. Other quotas of computer resources not shown in FIG. 8 are allocated, such memory and block storage.

A background process 805 running against snapshot PDB 730 performs Automated Index Creation, using query history in PDB 720 to create auto-indexes in snapshot PDB 730. Auto-indexes shown to have improved a query by test-execute verification are created in the background process 805 in PDB 720. Database processes running against PDB 720 perform first-in verification.

So that Automated Index Creation is run against a recent and therefore accurate copy of PDB 720, snapshot PDB 730 can be in effect refreshed on periodic basis. Snapshot PDB 730 is refreshed by creating snapshot PDB 730 as a new snapshot database copy, which can be performed almost instantaneously as snapshot database copy does not entail materializing a copy of the data in the base database.

Database Overview

Embodiments of the present invention are used in the context of DBMSs. Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command (e.g. query) may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Optimizer and Execution Plans

Generally, a query compiles a query statement and generates an internal query representation of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation by a query optimizer.

The term query is used herein to refer to any form of representing a query, including a query in the form of a database statement or in the form of an internal query representation. A query optimizer may receive a query from another entity other than query parser, where the query received is in the form of an internal query representation.

A query optimizer generates one or more different candidate execution plans for a query. The query optimizer evaluates the one or more candidate execution plan to determine which should be used to compute the query.

Execution plans may be represented by a graph of interlinked nodes, referred to herein as operators, that each corresponds to a step of an execution plan, referred to herein as an execution plan operation. The hierarchy of the graphs (i.e., directed tree) represents the order in which the execution plan operations are performed and how data flows between each of the execution plan operations. Execution plan operations include, for example, a table scan, an index scan, hash-join, sort-merge join, nested-loop join, and filter.

Compiling a query by entail transforming the query. In general, transforming a query involves rewriting a query into another query that produces the same result and that can potentially be executed more efficiently, i.e. one for which a potentially more efficient and less costly execution plan can be generated. Examples of query transformation include view merging, subquery unnesting, filter predicate move-around and pushdown, common sub-expression elimination, outer-to-inner join conversion, materialized view rewrite, star transformation, and, join predicate push down. A query is rewritten by manipulating a deep copy of the query representation to form a transformed query representation representing a transformed query. The query as transformed is referred to herein as the transformed query; the query whose copy is transformed is referred to as the base query.

Query compilation may also perform more than one transformation for evaluation. Each transformed query generated for a query is referred to as a candidate transformed query or candidate query. A transformed query rewritten to generate another transformed query is referred to herein as a base query for the other transformed query. The query originally received by a query optimizer is referred to as the original query.

The original query an optimizer optimizes and the alternate transformed queries generated for the query are referred to individually as a "candidate query" and collectively as the "query search space." The one or more candidate execution plans generated for each query in the query search space are collectively referred to as the "plan search space."

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
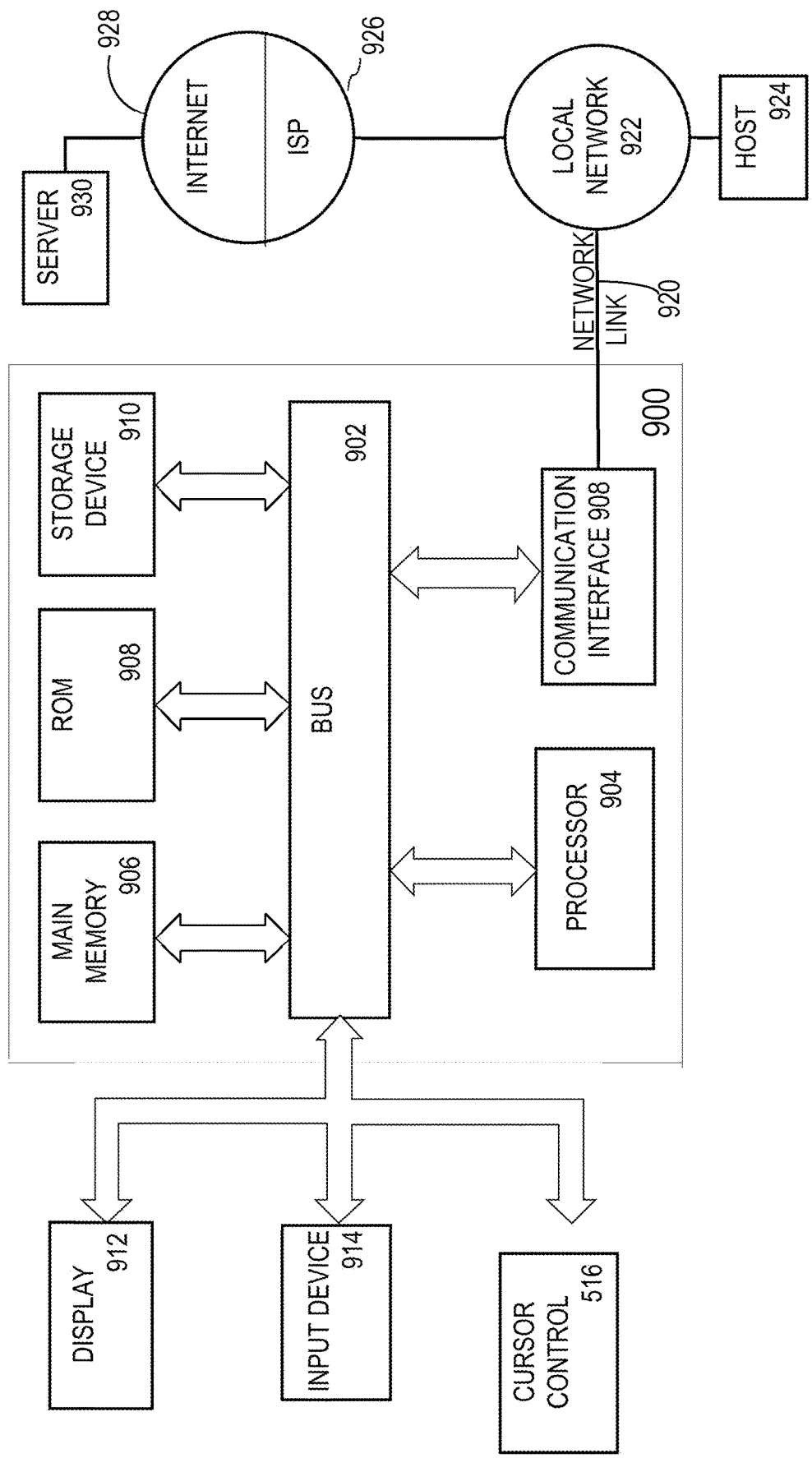
FIG. 9 is a diagram depicting a computer system that may be used to implement an embodiment of the present invention.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 10:
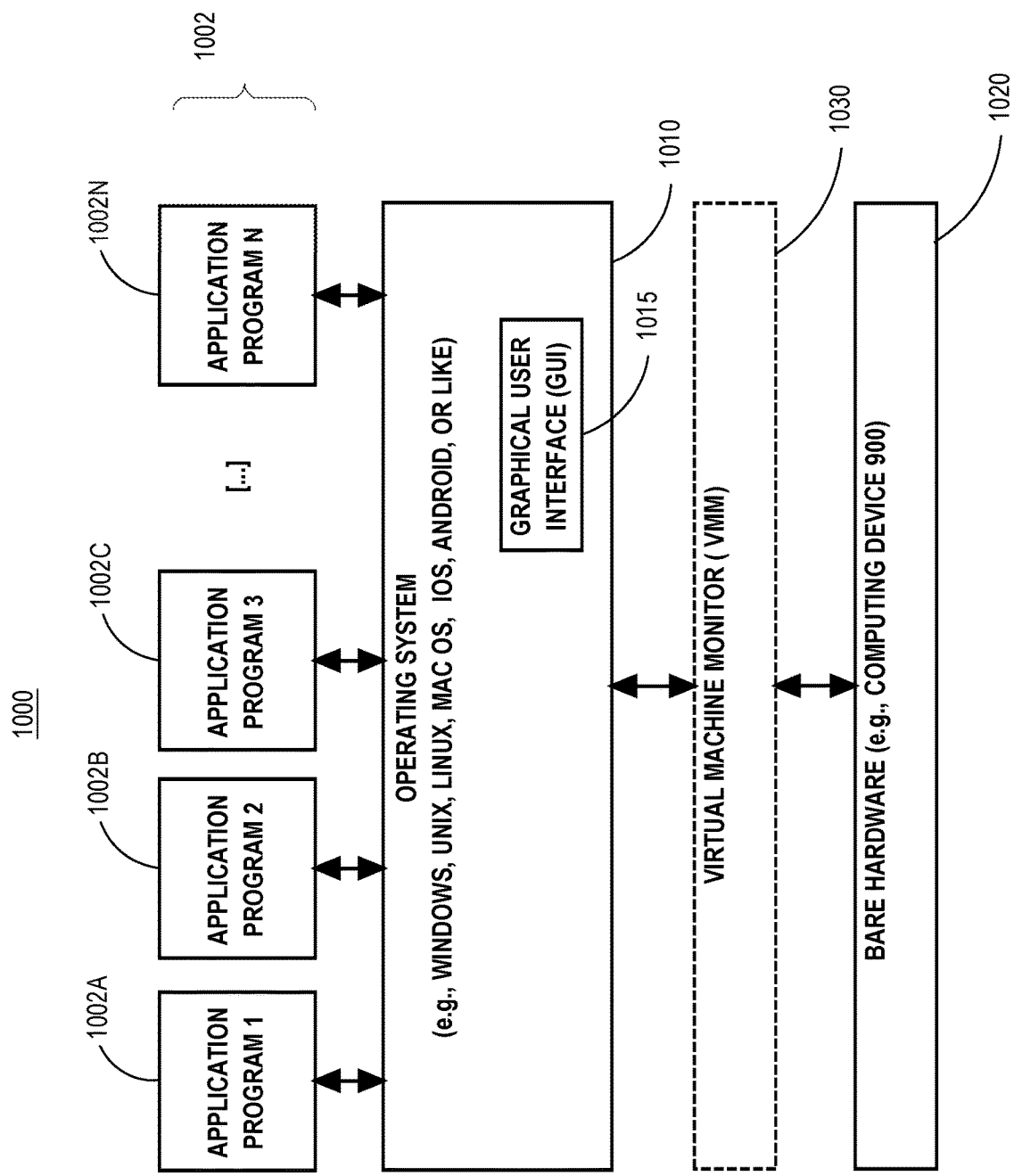
FIG. 10 depicts a software system that may be employed for controlling the operation of a computer system according to an embodiment of the present invention.

FIG. 10 is a block diagram of a basic software system 1000 that may be employed for controlling the operation of computer system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computer system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 900 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). DBaaS was described earlier.

What is claimed is:

1. A method, comprising:
a DBMS selecting a working set of queries;
monitoring column usage of said working set of queries;
based on said column usage, selecting a certain set of one or more auto indexes;
in response to selecting said certain set of one or more auto indexes, making said certain set of one or more auto indexes available for executing queries not in said working set;
after making said certain set of one or more auto indexes available:
compiling a particular query not in the working set of queries thereby generating a first execution plan, said first execution plan using a particular auto index of said certain set of one or more auto indexes;
compiling said particular query again thereby generating a second execution plan, wherein compiling said particular query again includes, in response to using said particular auto index for said first execution plan, preventing use of said particular auto index for said second execution plan;
monitoring query execution performance of said first execution plan;
based on said query execution performance of said first execution plan, locking down said particular auto index for said particular query.

2. The method of claim 1, wherein selecting the certain set of one or more auto indexes includes:
based on said column usage, creating a first set of meta-only auto indexes;
compiling at least some of said working set of queries; and
determining a second set of said meta-only auto indexes selected by compiling at least some of said working set of queries.

3. The method of claim 2, wherein before compiling said at least some of said working set of queries, generating index statistics for said first set of meta-only auto index.

4. The method of claim 3, wherein said at least two of said meta-only auto indexes of said first set of meta-only auto indexes index a particular table, wherein generating index statistics includes generating said index statistics by performing a single index statistics scan of said particular table to generate index statistics for said at least two of said meta-only auto indexes.

5. The method of claim 2, wherein compiling at least some of said working set of queries includes performing dynamic predicate sampling.

6. The method of claim 2, further including:
   materializing said second set of said meta-only auto indexes;
   compiling a third set of queries from said working set of queries;
   executing said third set of queries thereby generating performance metrics for executing said third set of queries;
   wherein said making said certain set of one or more auto indexes available is based on said performance metrics.

7. The method of claim 6, the method further including, based on said performance metrics, locking down a particular auto-index from the materialized second set of said meta-only auto indexes for a query from said third set of queries.

8. The method of claim 7, wherein locking down said particular auto-index from the materialized second set of said meta-only auto indexes includes generating a SQL profile that causes said particular auto-index form the materialized second set to not be used for generating an execution plan.

9. The method of claim 6, wherein said second set of meta-only auto indexes index a particular table, wherein materializing said second set of said meta-only auto indexes includes performing a single index creation scan of said particular table to materialize multiple of said second set of meta-only auto indexes.

10. The method of claim 1, further including:
    monitoring usage of said certain set of one or more auto indexes; and
    deactivating at least one of said certain set of one or more auto indexes based on said usage of said certain set of one or more auto indexes.

11. One or more non-transitory computer-readable media storing sequences of instructions which, when executed by one or more processors, cause:
    a DBMS selecting a working set of queries;
    monitoring column usage of said working set of queries;
    based on said column usage, selecting a certain set of one or more auto indexes;
    in response to selecting said certain set of one or more auto indexes, making said certain set of one or more auto indexes available for execution queries not in said working set;
    after making said certain set of one or more auto indexes available:
        compiling a particular query not in the working set of queries thereby generating a first execution plan, said first executing plan using a particular auto index of said certain set of one or more auto indexes;
        compiling said particular query again thereby generating a second execution plan, wherein compiling said particular query again includes, in response to using said particular auto index for said first execution plan, preventing use of said particular auto index for said second execution plan;
        monitoring query execution performance of said first execution plan;
        based on said query execution performance of said first execution plan, locking down said particular auto index for said particular query.

12. The one or more non-transitory computer-readable media of claim 11, wherein selecting the certain set of one or more auto indexes includes:
    based on said column usage, creating a first set of meta-only auto indexes;
    compiling at least some of said working set of queries; and
    determining a second set of said meta-only auto indexes selected by compiling at least some of said working set of queries.

13. The one or more non-transitory computer-readable media of claim 12, wherein the sequences of instructions include instructions that, when executed by said one or more processors, cause: before compiling said at least some of said working set of queries, generating index statistics for said first set of meta-only auto index.

14. The one or more non-transitory computer-readable media of claim 13, wherein said at least two of said meta-only auto indexes of said first set of meta-only auto indexes index a particular table, wherein generating index statistics includes generating said index statistics by performing a single index statistics scan of said particular table to generate index statistics for said at least two of said meta-only auto indexes.

15. The one or more non-transitory computer-readable media of claim 12, wherein compiling at least some of said working set of queries includes performing dynamic predicate sampling.

16. The one or more non-transitory computer-readable media of claim 12, wherein the sequences of instructions include instructions that, when executed by said one or more processors, cause:
    materializing said second set of said meta-only auto indexes;
    compiling a third set of queries from said working set of queries;
    executing said third set of queries thereby generating performance metrics for executing said third set of queries;
    wherein said making said certain set of one or more auto indexes available is based on said performance metrics.

17. The one or more non-transitory computer-readable media of claim 16, wherein the sequences of instructions include instructions that, when executed by said one or more processors, cause, based on said performance metrics, locking down a particular auto-index from the materialized second set of said meta-only auto indexes for a query from said third set of queries.

18. The one or more non-transitory computer-readable media of claim 17, wherein locking down said particular auto-index from the materialized second set of said meta-only auto indexes includes generating a SQL profile that causes said particular auto-index form the materialized second set to not be used for generating an execution plan.

19. The one or more non-transitory computer-readable media of claim 16, wherein said second set of meta-only auto indexes index a particular table, wherein materializing said second set of said meta-only auto indexes includes performing a single index creation scan of said particular table to materialize multiple of said second set of meta-only auto indexes.

20. The one or more non-transitory computer-readable media of claim 11, wherein the sequences of instructions include instructions that, when executed by said one or more processors, cause:
    monitoring usage of said certain set of one or more auto indexes; and
    deactivating at least one of said certain set of one or more auto indexes based on said usage of said certain set of one or more auto indexes.

\* \* \* \* \*

UNITED STATES PATENT AND TRADEMARK OFFICE
CERTIFICATE OF CORRECTION

Page 1 of 3

PATENT NO. : 11,068,460 B2
APPLICATION NO. : 16/248479
DATED : July 20, 2021
INVENTOR(S) : Zait et al.

It is certified that error appears in the above-identified patent and that said Letters Patent is hereby corrected as shown below:

On the Title Page

On page 2, Column 2, item (56) under Other Publications, Line 16, delete "Povisioning" and insert -- Provisioning --, therefor.

On page 2, Column 2, item (56) under Other Publications, Line 25, delete "Verison" and insert -- Version --, therefor.

On page 2, Column 2, item (56) under Other Publications, Line 26, delete "IERF" and insert -- IETF --, therefor.

On page 2, Column 2, item (56) under Other Publications, Line 31, delete "Tuing" and insert -- Tuning --, therefor.

In the Drawings

On sheet 2 of 11, in FIG. 2, under Reference Numeral 235, Line 3, delete "exeucuted," and insert -- executed, --, therefor.

On sheet 2 of 11, in FIG. 2, under Reference Numeral 225, Line 2, delete "STATISISTICS" and insert -- STATISTICS --, therefor.

On sheet 4 of 11, in FIG. 4A, under Reference Numeral 235, Line 3, delete "exeucuted," and insert -- executed, --, therefor.

In the Specification

In Column 5, Line 65, delete "o" and insert -- or --, therefor.

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,068,460 B2

In the Claims

In Column 20, Line 60, in Claim 2, delete "of said" and insert -- of --, therefor.

In Column 20, Line 65, in Claim 3, delete "index." and insert -- indexes. --, therefor.

In Column 20, Line 66, in Claim 4, delete "wherein said" and insert -- wherein --, therefor.

In Column 20, Line 66, in Claim 4, delete "two of said" and insert -- two --, therefor.

In Column 21, Line 6, in Claim 4, delete "two of said" and insert -- two --, therefor.

In Column 21, Line 11, in Claim 6, delete "of said" and insert -- of --, therefor.

In Column 21, Line 22, in Claim 7, delete "of said" and insert -- of --, therefor.

In Column 21, Line 27, in Claim 8, delete "said meta-only" and insert -- meta-only --, therefor.

In Column 21, Line 28, in Claim 8, delete "form" and insert -- from --, therefor.

In Column 21, Line 29, in Claim 8, delete "set" and insert -- set of meta-only auto indexes --, therefor.

In Column 21, Line 33, in Claim 9, delete "of said" and insert -- of --, therefor.

In Column 21, Line 52, in Claim 11, delete "execution" and insert -- executing --, therefor.

In Column 21, Line 58, in Claim 11, delete "executing" and insert -- execution --, therefor.

In Column 22, Line 12, in Claim 12, delete "of said" and insert -- of --, therefor.

In Column 22, Line 20, in Claim 13, delete "index." and insert -- indexes. --, therefor.

In Column 22, Line 22, in Claim 14, delete "wherein said" and insert -- wherein --, therefor.

In Column 22, Line 22, in Claim 14, delete "two of said" and insert -- two --, therefor.

In Column 22, Line 27, in Claim 14, delete "two of said" and insert -- two --, therefor.

In Column 22, Line 38, in Claim 16, delete "of said" and insert -- of --, therefor.

In Column 22, Line 52, in Claim 17, delete "of said" and insert -- of --, therefor.

In Column 22, Line 57, in Claim 18, delete "of said" and insert -- of --, therefor.

In Column 22, Line 59, in Claim 18, delete "form" and insert -- from --, therefor.

In Column 22, Line 64, in Claim 19, delete "of said" and insert -- of --, therefor.